(12) United States Patent
Ziegler (10) Patent No.: US 9,031,893 B2
(45) Date of Patent: May 12, 2015

(54) BEST MATCH PROCESSING MODE OF DECISION TABLES

(71) Applicant: Carsten Ziegler, Walldorf (DE)

(72) Inventor: Carsten Ziegler, Walldorf (DE)

(73) Assignee: SAP SE, Walldorf (DE)

( * ) Notice: Subject to any disclaimer, the term of this patent is extended or adjusted under 35 U.S.C. 154(b) by 281 days.

(21) Appl. No.: 13/721,391

(22) Filed: Dec. 20, 2012

(65) Prior Publication Data

US 2014/0180995 A1    Jun. 26, 2014

(51) Int. Cl.
*G06N 5/02* (2006.01)
*G06F 7/00* (2006.01)

(52) U.S. Cl.
CPC .................................... *G06N 5/025* (2013.01)

(58) Field of Classification Search
None
See application file for complete search history.

(56) References Cited

U.S. PATENT DOCUMENTS

| | | | |
|---|---|---|---|
| 8,200,527 B1* | 6/2012 | Thompson et al. | 705/7.39 |
| 8,676,667 B1* | 3/2014 | Paiz | 705/26.63 |
| 2002/0128773 A1* | 9/2002 | Chowanic et al. | 701/210 |
| 2006/0259418 A1* | 11/2006 | Feaver et al. | 705/37 |
| 2012/0158628 A1* | 6/2012 | Junker | 706/14 |
| 2013/0204524 A1* | 8/2013 | Fryer et al. | 701/527 |
| 2013/0204526 A1* | 8/2013 | Boschker et al. | 701/533 |

OTHER PUBLICATIONS

Carsten Ziegler et al.; Business Rules Framework plus—The Very Basics; published on-line on Jun. 22, 2008; 17 pages (http://www.sdn.sap.com/irj/sdn/go/portal/prtroot/docs/library/uuid/40b876cb-098b-2b10-f4bc-db7d4f1b55f5?overridelayout=true).

* cited by examiner

*Primary Examiner* — Alan Chen (57) ABSTRACT

An input combination of at least one condition value to be evaluated against at least one rule of a decision table is received. The at least one rule includes at least one condition and the rule is associated with a result. The at least one rule is evaluated against the input combination to determine conditions fulfilled for the at least one condition value. In one aspect, a rule from the at least one rule that best matches the input combination is determined and a result associated with the rule that best matches the input combination is outputted.

18 Claims, 10 Drawing Sheets

First Match Mode

| # | Source Location 105 | Target Location 110 | Weight 115 | | Carrier 120 |
|---|---|---|---|---|---|
| 1 | Shanghai 132 | Hamburg 134 | < 1000 KG | 136 | DHL 138 |
| 2 | Shanghai 142 | Hamburg 144 | | 146 | TNT 148 |
| 3 | Shanghai 152 | New York 154 | 0 KG – 200 KG | 156 | DHL 158 |
| 4 | Shanghai 162 | New York 164 | > 200 KG | 166 | UPS 168 |
| 5 | Shanghai 172 | 174 | | 176 | DHL 178 |
| 6 | 182 | 184 | | 186 | TNT 188 |

FIG. 1

All Match Mode

| # | Source Location 205 | Target Location 210 | Weight 215 | Carrier 220 |
|---|---|---|---|---|
| 1 | Shanghai | Hamburg | < 1000 KG | DHL 238 |
| 2 | Shanghai | Hamburg | | TNT 248 |
| 3 | Shanghai | New York | 0 KG – 200 KG | DHL |
| 4 | Shanghai | New York | > 200 KG | UPS |
| 5 | Shanghai | San Francisco | | DHL |
| 6 | Shanghai | San Francisco | | TNT |

Layout variation

| # | Source Location 805 | Target Location 810 | Weight 815 | | |
|---|---|---|---|---|---|
| | | | < 200 KG 840 / Carrier | 200 KG – 1000 KG 842 / Carrier | > 1000 KG 844 / Carrier |
| 1 | Shanghai | Hamburg | DHL | DHL | TNT |
| 2 | Shanghai | New York | DHL | UPS | UPS |
| 3 | Shanghai | San Francisco | DHL | DHL | DHL |

BEST MATCH PROCESSING MODE OF DECISION TABLES

BACKGROUND

Decision tables are a known approach for modeling complex logic. Decision tables are used to describe and analyze problems that involve decision situations that may be characterized by one or more conditions whose state determines further actions. Such situations may be too complex to be described by flowcharts, if-then-else or do-case statements, or other similar conditional expressions. Commonly, the process of describing a decision situation by a decision table involves, on one hand, identifying the conditions and actions associated with the situation, and, on the other, indicating which actions are to be executed for various combinations of conditions. The decision table itself serves as a concise notational tool for listing these conditions and actions as decision rules.

Typically, the decision rules of a decision table are evaluated for one or more inputs to identify a decision rule that matches the input. Commonly, a result is returned only if the input satisfies all conditions of at least one decision rule. In case an input does not satisfy all conditions of any of the rules defined in the decision table, no result is returned. For example, a result may not be returned if the decision rules defined in the decision table are too specific. Usually, specific decision rules cannot cover a wide range of situations. However, often at least one result is expected to be returned by decision tables. Thus, returning no result may be problematic.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Embodiments of techniques for best match processing mode of decision tables are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Figure 1:
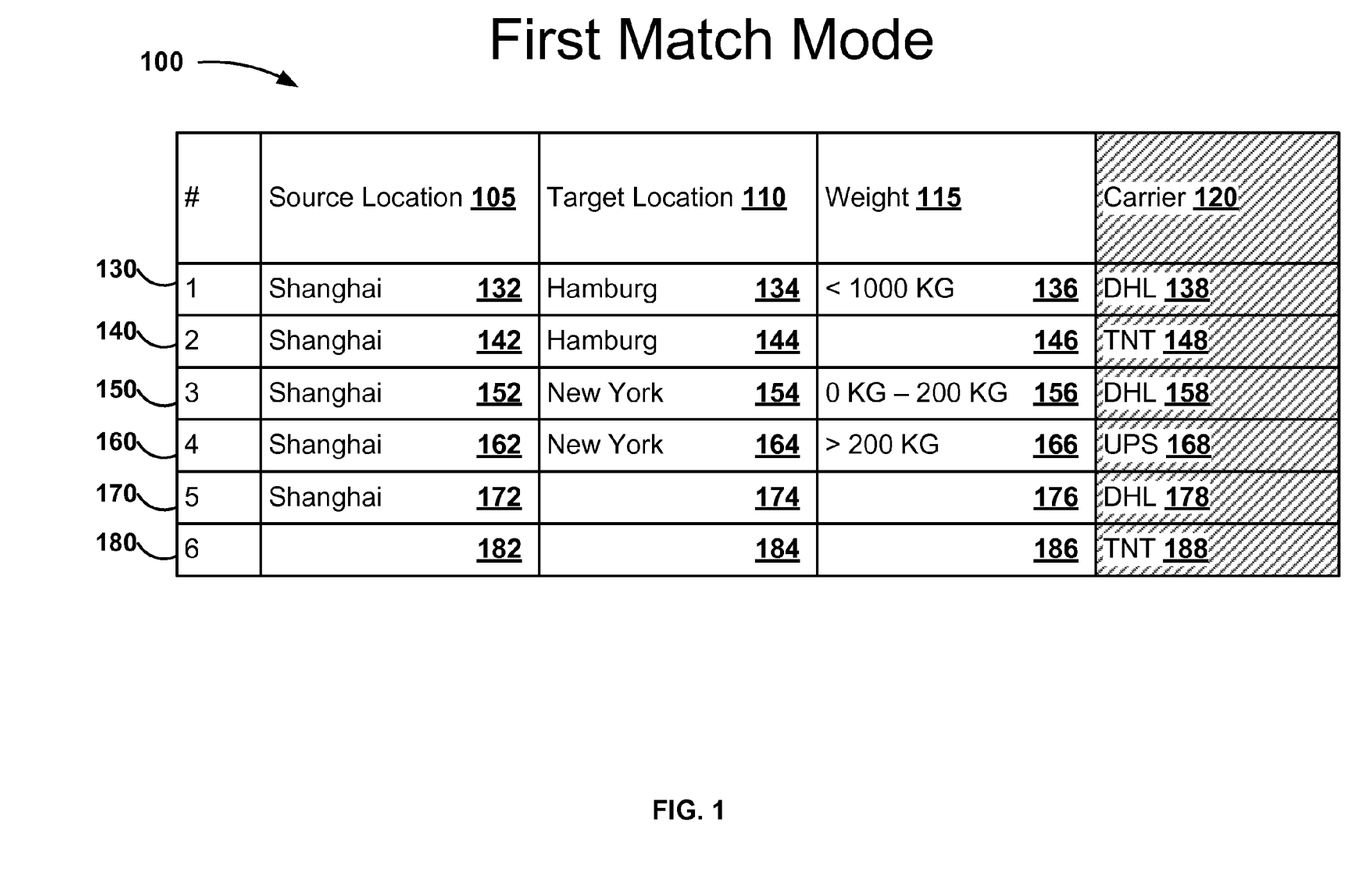
FIG. 1 illustrates an exemplary decision table configured to operate in a single match mode.

FIG. 1 illustrates an exemplary decision table 100. Decision tables automate decision processes. A decision table is a tabular representation of related decision rules or conditional expressions, within a predefined problem area. A decision rule is a combination of conditions that is associated with corresponding result to be returned or an action to be performed when the rule is satisfied. For example, decision table 100 represents in a tabular form decision rules 130-180. Decision rules 130-180 include combinations of conditions of types 'Source Location' 105, 'Target Location' 110, and 'Weight' 115, e.g., combinations of conditions 132-136; 142-146; 152-156; 162-166; 172-176; and 182-186, respectively. Further, decision rules 130-180 include corresponding results 138, 148, 158, 168, 178, and 188 that are associated with the respective combinations of conditions 132-136; 142-146; 152-156; 162-166; 172-176; and 182-186.

In one embodiment, a decision rule of a decision table may represent a unique combination of conditions within the table. In one embodiment, a condition of a decision rule may be an expression that requires evaluation. For example, a condition of a rule may be a combination of explicit values, ranges of values, constants, variables, operators, and functions that are interpreted according to the computational principles of the particular computer system. Values can be of various types including, but not limited to, numbers, strings, and Booleans. Similarly, a result of a rule may also be an expression that requires evaluation, and be a combination of values, variables, formulas, operators, functions, etc.

In addition to representing related decision rules in a tabular form, a decision table implements business and other logic encoded in a programming language executed by a processor. In one embodiment, a decision table is an expression type in a business rules management system (BRMS) such as SAP NetWeaver® Business Rules Management (SAP NetWeaver® BRM) provided by SAP AG. Expression of type decision table defines a self-contained computational unit with a predefined logic. In one embodiment, decision tables may use context or nest other decision tables or other expressions to calculate, determine, or derive a result. In one embodiment, decision tables can be reused as a nested building block for a decision rule.

In one embodiment, each row of a decision table corresponds to a single rule, with the columns defining the conditions and also the actions or results of the rules. For example, each row of decision table 100 corresponds to a rule from rules 130-180. Column 'Source Location' 105, column 'Target Location' 110, and column 'Weight' 115 define the conditions of rules 130-180 (e.g., conditions 132-136; 142-146; 152-156; 162-166; 172-176; and 182-186, respectively). Column 'Carrier' 120 defines results to be returned in case respective rules 130-180 are satisfied.

Decision rules 130-180 are evaluated for one or more inputs to identify one or more rules that match the input, e.g., a rule whose conditions are satisfied for the input. In one embodiment, rules 130-180 of decision table 100 are processed sequentially, e.g., in the order of the rows. In one embodiment, if all conditions in a row are met, the corresponding result value in the row is returned. Following course of action may be determined based on the result returned by the decision table.

Commonly, decision tables can work in two modes of operation, e.g., a single match mode and a multiple match mode. In the single match mode, processing of the decision table stops at the first matching rule, thus returning a single result. A matching rule is a rule the conditions of which are satisfied for the input combination of condition values. Since, the processing of the decision table stops at the first matching rule, the single match mode of operation may also be described as a first match mode.

Decision table 100 may be configured to operate in a single match mode. For example, first processed is rule 130. If the value of the input condition 'Source Location' 105 is "Shanghai" and the value of the input 'Target Location' 110 is "Hamburg" and the value of the input 'Weight' 115 is less than "1000 KG", then as a result "DHL" 138 is returned as "Carrier" 120. Result 138 is returned only if conditions 132-136 are satisfied. If any one condition from conditions 132-136 is not satisfied, then rule 140 is processed next. Similarly, result 148 is returned only if conditions 142-146 are satisfied for the input combinations of values. Rule 140 is a more generic version of rule 130. Accordingly, if a combination of input condition values satisfies rule 130, then the same input combination satisfies rule 140 as well. For example, in case the values of the input conditions 'Source Location' 105 and 'Target Location' 110 are the same as conditions 132 and 134 of rule 130, but the weight 115 is not less than 1000 kg, then rule 130 is not satisfied, rule 140 as more generic is satisfied and a result "TNT" 148 is returned. The processing of decision table 100 continues until a matching row is found. If rules 130-160 do not match the input combination of condition values, and if 'Source Location' 105 is "Shanghai", then rule 170 is satisfied and "DHL" 178 is returned as "Carrier" 120.

In case the input does not satisfy any of rules 130-170, rule 180 is triggered and "TNT" 188 is returned as a result. Rule 180 is defined as a generic default rule. A default generic rule is a rule that includes at least one default condition. For example, a default condition may be a blank condition or a condition that is fulfilled, correct or true for any input. Rule 180 is defined to include default conditions 182-186. Rule 170 is also constructed as a default generic rule because it includes default conditions (e.g., conditions 174 and 176).

Figure 2:
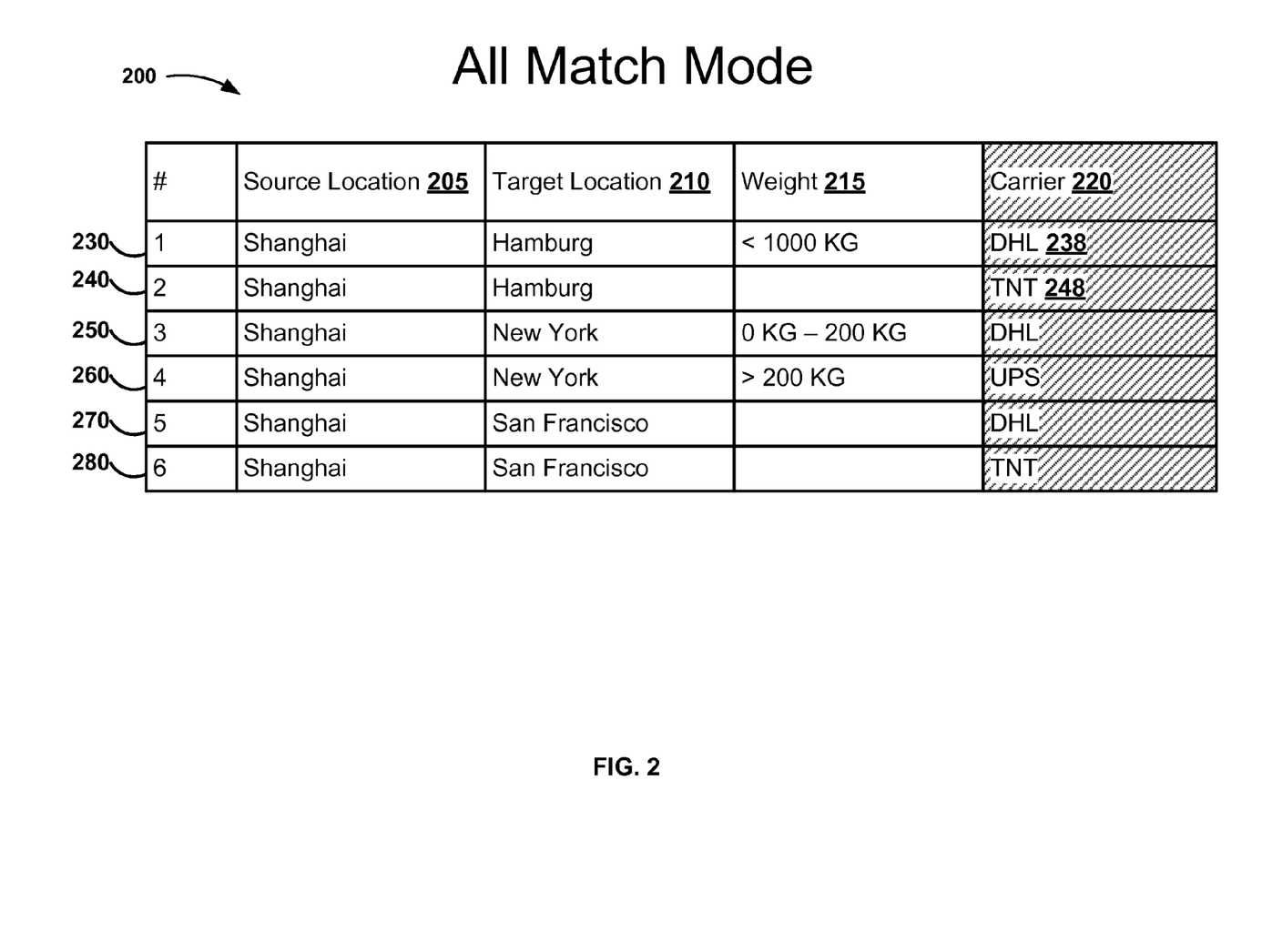
FIG. 2 illustrates an exemplary decision table configured to operate in a multiple match mode.

FIG. 2 illustrates an exemplary decision table 200. Decision table 200 may be configured to operate in a multiple match mode. In the multiple match mode, processing of a decision table is not stopped at the first matching rule. Instead, in the multiple match mode, all rules of a decision table are processed and the results of all matching rules are returned. Since, the processing of the decision table does not stop until the results of all matching rules are returned, the multiple match mode of operation may also be described as an all match mode. For example, if the value of the input condition 'Source Location' 205 is "Shanghai" and the value of the input 'Target Location' 210 is "Hamburg" and the value of the input 'Weight' 215 is, for example, "500 KG", then as a result both "DHL" 238 and "TNT" 248 are returned as "Carrier" 220. Thus, decision table 200 may return multiple results when it operates in a multiple match mode. Rules 240, 270 and 280 are examples of default generic rules.

In both, the single match and the multiple match processing modes, a result is returned if the input combination of condition values satisfies all conditions of at least one rule in the table. In both, the single match and multiple match processing modes, if a matching combination of conditions is not found in the table, a result is not returned. Typically, to prevent situations of returning no result, decision tables are constructed to include one or more default generic rules that will return result if no other rule in the decision table is satisfied. Defining generic rules in decision tables ensures that a result will be returned, regardless of the input combination of condition values. The objective is to construct a decision table that covers all possible situations within the predefined problem area. However, defining default generic rules may have several disadvantages. One disadvantage is that a single generic rule may not return proper result for a wide range of situations. Therefore, often multiple generic rules are defined to return results for various situations and input combinations. In practice, the number of default generic rules increases proportionally to the number of condition types defined in the condition columns. For example, for one or more condition types, corresponding generic rules are defined. Defining many generic rules may be disadvantageous because the readability and understandability of a decision table may be obscured.

Further, rules of a decision table with generic default conditions are non-exclusive or overlapping. Rules are overlapping or non-exclusive if one input combination of condition values can satisfy the overlapping rules. For example, rule 230 overlaps with rule 240, and rule 270 overlaps with rule 280. In a decision table with non-exclusive rules, an input combination of condition values can satisfy more than one rule. When a table is constructed to include non-exclusive decision rules, the order of the rules in the table is used to determine which of the satisfied overlapping rules to return a result. Usually, in the single match mode, the first matching rule in the sequence of rules applies. A decision table with non-exclusive rules may be disadvantageous because various optimizations that can be applied to tables that comprise of mutually exclusive rules could not be applied to tables with non-exclusive rules. For example, the order in which the rules are evaluated does not determine the result to be returned. Whereas, the order of the rules evaluation affects the result determination in a table with non-exclusive rows. An input combination of condition values may satisfy only one of the mutually exclusive rules. Table 1 below illustrates examples of mutually exclusive rules.

TABLE 1

| | Source Location | Target Location | Weight | Carrier |
|---|---|---|---|---|
| 1 | Shanghai | Hamburg | <1000 KG | DHL |
| 2 | Shanghai | Hamburg | >=1000 KG | TNT |

A best match mode of operation of decision tables is implemented. In the best match mode, all rules of a decision table are processed to determine a rule that best matches the input combination of condition values. Decision tables that are set to operate in the best match mode, identify a best matching result for the input combination of condition values. Decision tables when processed in the best match mode return a result even when the input does not satisfy all conditions of any of the rules defined in the decision table. Moreover, the result returned is associated with the rule that best matches the input combination. Thus, a decision table that is configured to operate in the best match mode returns a result even when no default generic rules are defined in the table.

Figure 3:
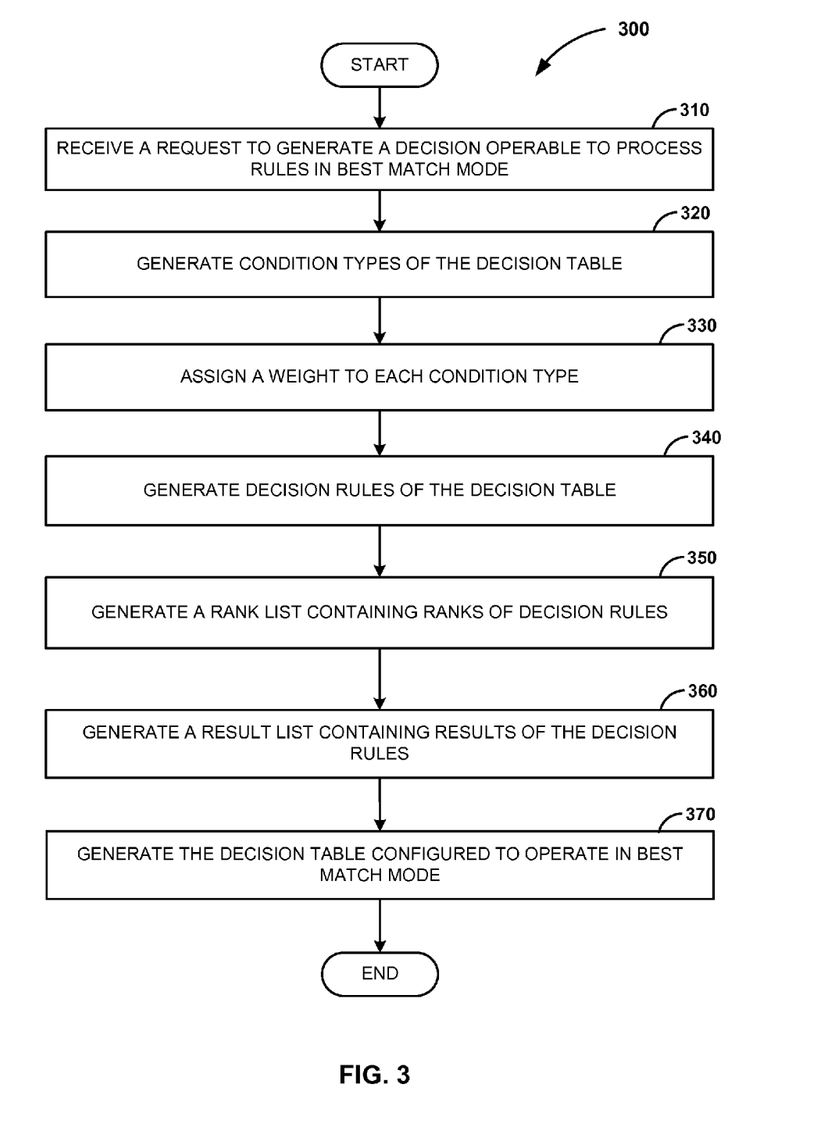
FIG. 3 illustrates a process to construct a decision table operable to process decision rules in a best match mode, according to one embodiment.

FIG. 3 illustrates process 300 to construct a decision table operable to process decision rules in a best match mode, according to one embodiment. At 310, a request to generate a decision table that is operable to process rules in best match mode is received. At 320, condition types of the decision table are generated. In one embodiment, the condition types correspond to condition columns of the decision table. For example, in FIG. 1, condition column 'Source Location' 105, condition column 'Target Location' 110, and condition column 'Weight', each correspond to one condition type.

At 330, weight is assigned to each condition type. Thus, condition columns are associated with corresponding weights. In one embodiment, a weight is a quantitative value assigned to a condition type to determine a degree of significance of the condition type to the overall decision process automated by the decision table. In particular, a weight of a condition may represent the relative significance of the condition for the rules of the decision table. Depending on the condition type of a condition of a rule, the condition is associated with the respective weight of the condition type. In one embodiment, the weight may be a percentage. If the weight of each condition type is a percentage, the sum of the weights of the condition types will be equal to one hundred percent. In one embodiment, the condition types of a decision table may be associated with a weight that equals one. In such case, all conditions have equal degree of significance to the overall decision process automated by the decision table.

At 340, decision rules of the decision table are generated. The rules are constructed to include conditions from the generated condition types. In one embodiment, the decision rules correspond to rows of the decision table. For example, in FIG. 1, each rule from decision rules 130-180 correspond to a row of decision table 100, and each rule includes conditions from condition types 105, 110, and 115. In one embodiment, decision rules may be business rules expressed in a decision table. Decision rules may specify business logic in a formal way. For example, decision rules of a decision table may be logical statements that determine and control the business functions of an organization. Examples of business rules may include, but are not limited to, business habits, manuals, policies, lines of computer code, etc.

In one embodiment, a weight may be assigned to each condition of each rule. For example, a weight may be associated with each cell of the table that represents a condition of a rule. Thus, weights may be assigned to conditions instead of to condition types, e.g., per condition cell instead of per condition column. In such case, it is possible that conditions from the same condition type are assigned different weights.

At 350, an empty rank list is generated. The rank list will include a rank of each decision rule of the decision table. In one embodiment, the rank list may be generated to initially include ranks of the rules that equal zero. In one embodiment, each row is associated with the rank of the corresponding rule represented by the row. To determine a rank of a decision rule, conditions of the rule are evaluated against input condition values to determine fulfilled or satisfied conditions for the input. The rank of the decision rule equals the sum of weights of the fulfilled conditions. In one embodiment, the rank of the decision rule may be equal to the number of fulfilled conditions of the rule.

At 360, a result list is generated. The result list includes results associated with the rules of the decision table. Thus, the result of every rule, respectively of every row, is to be included in the result list. At 370, a decision table that is configured to operate in the best match mode is generated.

Figure 4:
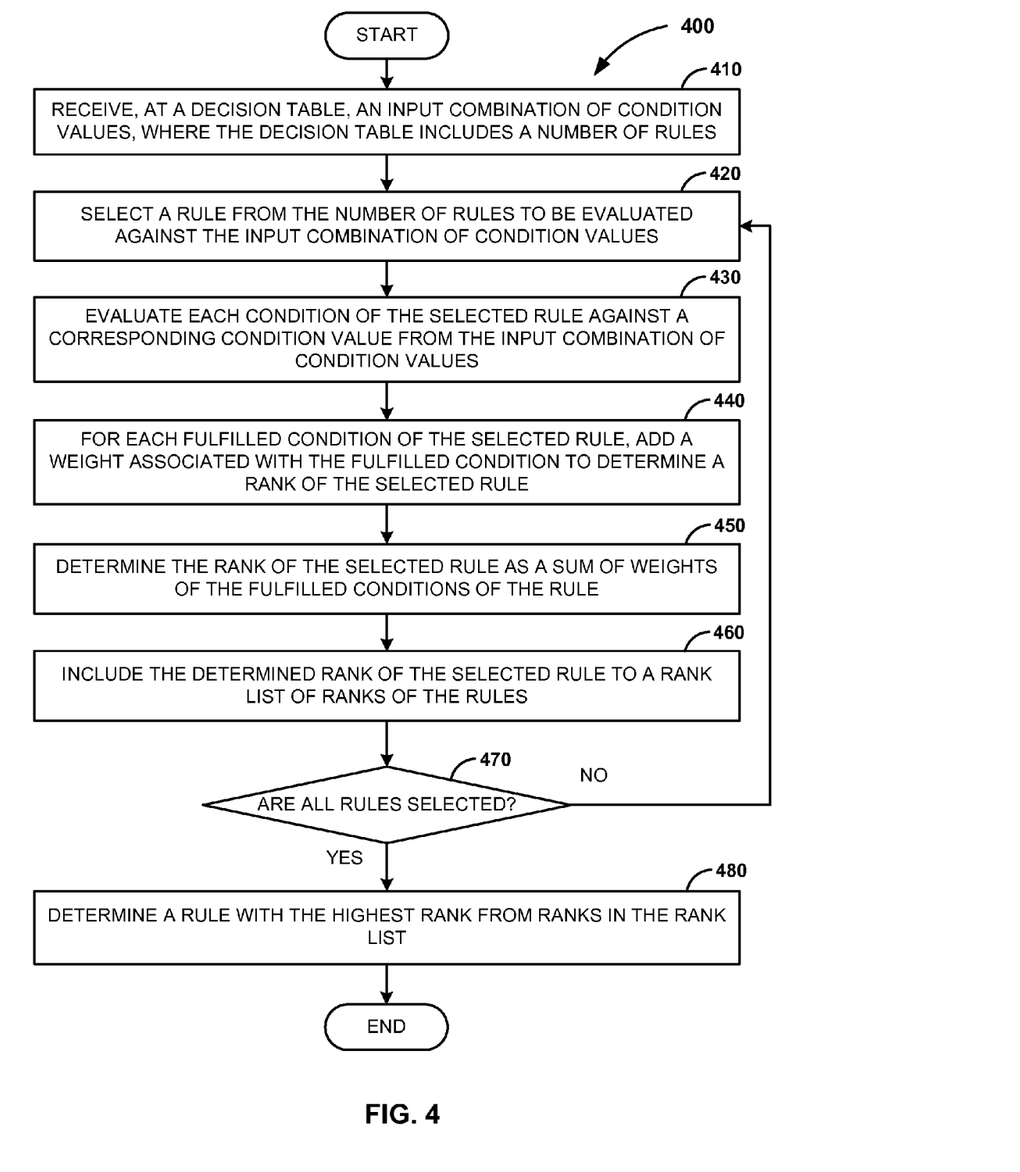
FIG. 4 illustrates a process to determine a best matching rule in a decision table, according to one embodiment

FIG. 4 illustrates process 400 to determine a best matching rule in a decision table, according to one embodiment. At 410, an input combination of condition values is received at a decision table. For example, with reference to FIG. 1, condition values for condition types 'Source Location' 105, 'Target Location' 110, and 'Weight' 115 may be received. In one embodiment, an input condition value may be an expression that requires processing. For example, value of the input condition may include variables, formulas, operations, etc. The decision table includes a number of decision rules. In one embodiment, the decision rules are ordered in a sequence.

At 420, a rule from the number of rules is selected to be evaluated against the input combination of condition values. In one embodiment, rules are selected to be processed according to their order in the sequence of rules in the table. At 430, each condition of the selected rule is evaluated against a corresponding condition value from the input combination of condition values. Conditions are compared with corresponding input condition values to determine the conditions that are fulfilled based on the comparison.

At 440, for each fulfilled condition of the selected rule, add a weight associated with the fulfilled condition to determine a rank of the selected rule. At 450, the rank of the selected rule is determined as a sum of weights of the fulfilled conditions of the rule. In one embodiment, each fulfilled condition of the selected rule is counted and the rank of the rule is determined to be equal to the number of fulfilled conditions of the rule.

At 460, the determined rank of the selected rule is included to a rank list of ranks of the rules. At 470, a check is performed to determine whether all rules from the decision table are selected. If there are unselected rules to be evaluated, next unselected rule in the sequence of rules is selected. If all rules from the decision table are selected, at 480, a rule with the highest rank from ranks in the rank list is determined. Based on the ranks included in the rank list, a best matching rule is determined as the rule with the highest rank.

Figure 5:
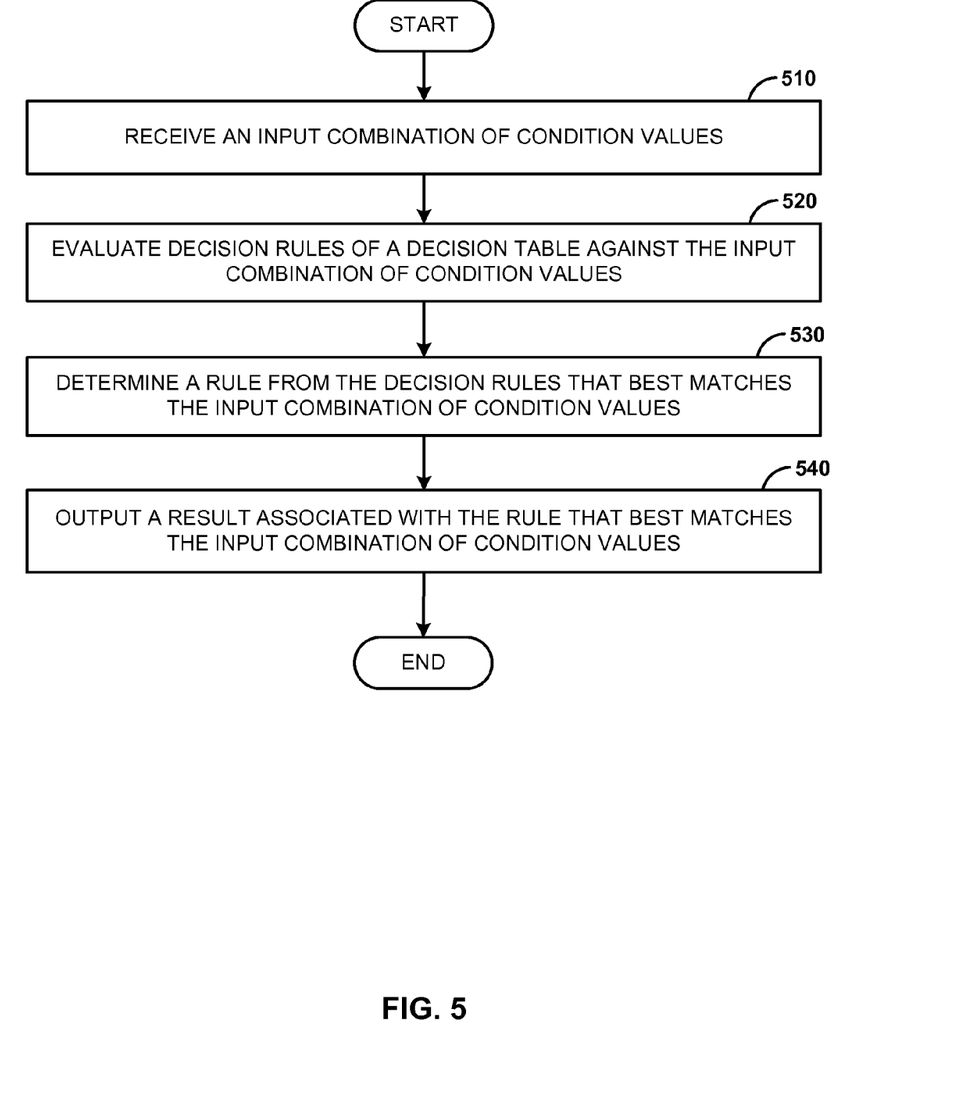
FIG. 5 illustrates processing of rules of a decision table in a best match mode, according to one embodiment.

FIG. 5 illustrates processing of rules of a decision table in a best match mode, according to one embodiment. The decision table is configured to process decision rules in a best match mode of operation. At 510, an input combination of condition values is received. In response to receiving the input combination of condition values, processing of the decision table is triggered. At 520, decision rules of the decision table are evaluated against the input combination of condition values. The decision rules are evaluated to determine conditions of the rules that are fulfilled for the input combination of condition values. The input combination of condition values is compared with respective conditions of the rules to determine those conditions that are fulfilled based on the comparison. In one embodiment, in the best match processing mode, all rules of a decision table are evaluated for one or more inputs to identify the rule that best matches the input combination of condition values At 530, a rule from the decision rules that best matches the input combination of condition values is determined. In one embodiment, to determine the best matching rule, each condition of each rule is evaluated against a corresponding input condition value to determine conditions fulfilled for the input condition value. Based on determined fulfilled conditions of the rules, ranks of the rules are determined. For example, in one embodiment, for each fulfilled condition of a rule, the weight associated with the fulfilled condition is added to determine a rank of the corresponding rule. Ranks of all rules are kept in a rank list of the decision table. The best matching rule is determined based on the ranks of the rules included in the rank list. The best matching rule is the rule with the highest rank from the ranks in the rank list. In one embodiment, to determine the best matching rule, conditions that are fulfilled for corresponding input condition values are counted and the best matching rule is determined as the rule with most conditions fulfilled. Thus, in one embodiment, ranks of rules may be equal to the number of fulfilled conditions of the respective rules.

At 540, a result of the rule that best matches the input combination of condition values is outputted. In one embodiment, results of rules are kept in a result list, where the order of the results in the list corresponds to the order of the rules in the table, according to one embodiment. A result from the result list of the table that is associated with a corresponding row representing the best matching rule is returned. Thus, the best matching rule is applied, and the result of the best matching rule is returned. Even if all conditions of the best matching rule are not satisfied, the result associated with the best matching rule is still returned. In one embodiment, to be outputted, the result of the best matching rule may be retrieved from the result column based on the row representing the best matching rule. Thus, results are optionally stored in a result list.

Due to the sequential processing of the rules defined in the table from top to bottom (e.g., from the first row to the last row), often rules are defined starting with the most specific combination of conditions in the first row, followed by rules with a decreasingly specific combination of conditions. In one embodiment, more than one rule may be best matching. For example, if two or more rules have equal rank that is also the highest rank. In such a case, the first best matching rule in the sequence of rules may be applied and the corresponding result of the rule is returned. Thus, the best matching rule from the best matching rules with the lowest row number may be selected to return a result. In the best match processing mode, order of the rules in the table may be optionally decisive for determination of the result. In one embodiment, a notification including the rest of the equally best matching rules may be sent. Alternatively, the results of all the best matching rules may be returned.

Figure 6:
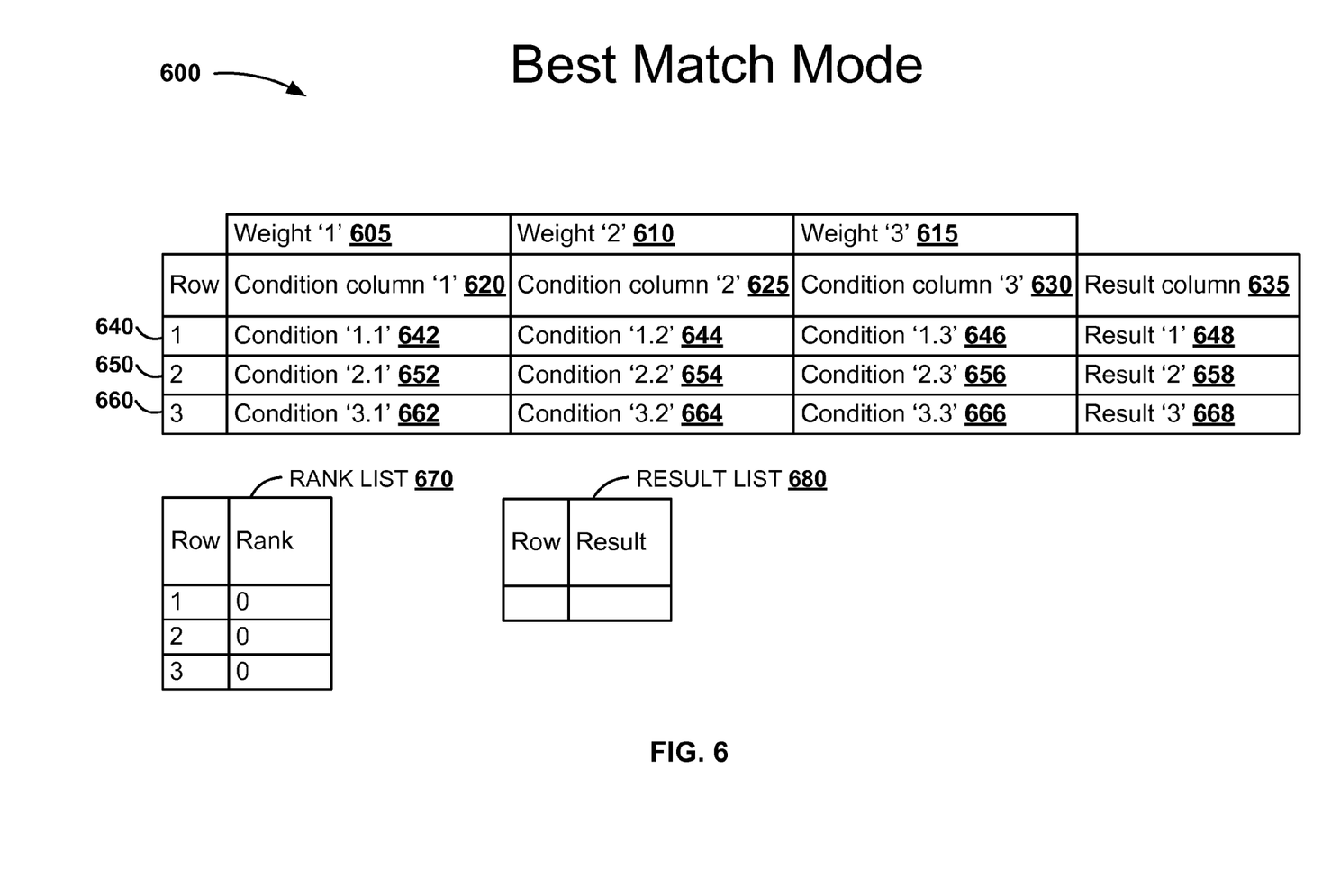
FIG. 6 illustrates an exemplary decision table configured to operate in a best match mode, according to one embodiment.

FIG. 6 illustrates exemplary decision table 600 configured to operate in the best match mode, according to one embodiment. Condition columns of a decision table configured to operate in the best match mode are associated with weights. For example, weight '1' 605 is associated with condition column '1' 620. Respectively, condition '1.1' 642 of rule 640, condition '2.1' 652 of rule 650, and condition '3.1' 662 of rule 660 are conditions that are included in condition column '1' 620, and thus are associated with weight '1' 605. Weight '2' 610 is associated with condition column '2' 625. Respectively, condition '1.2' 644 of rule 640, condition '2.2' 654 of rule 650, and condition '3.2' 664 of rule 660 are conditions that are included in condition column '2' 625, and thus are associated with weight '2' 610. Weight '3' 615 is associated with condition column '3' 630. Respectively, condition '1.3' 646 of rule 640, condition '2.3' 656 of rule 650, and condition '3.3' 666 of rule 660 are conditions that are included in condition column '3' 630, and thus are associated with weight '3' 615.

Based on evaluation of rules 640-660 in the best match mode, rank list 670 of table 600 will contain respective ranks of rules 640-660. In one embodiment, initially, ranks of rules 640-660 may be equal to zero. Result list 680 of table 600 will contain result '1' 648, result '2' 658, and result '3' 668 of rules 640-660, respectively, that are included in result column 635.

In one embodiment, an input combination of condition values is supplied to decision table 600. At runtime, the input combination of condition values is compared against defined conditions in rules 640-660, e.g., conditions 642-646; 652-656; and 662-666. In one embodiment, processing of rules 640-660 is sequential, starting with the first row. All cells are evaluated by checking the cell value against the corresponding input condition value. For each cell, a Boolean result is returned, either "true" or "false". Result "true" is returned in case the condition is satisfied for the corresponding input condition value. Alternatively, result "false" is returned by a cell in case the input condition value does not match the condition. In one embodiment, in the best match mode, the processing of the rules may not be performed necessarily in increasing order of the rows because all rules are evaluated to identify the best matching rule.

Figure 7:
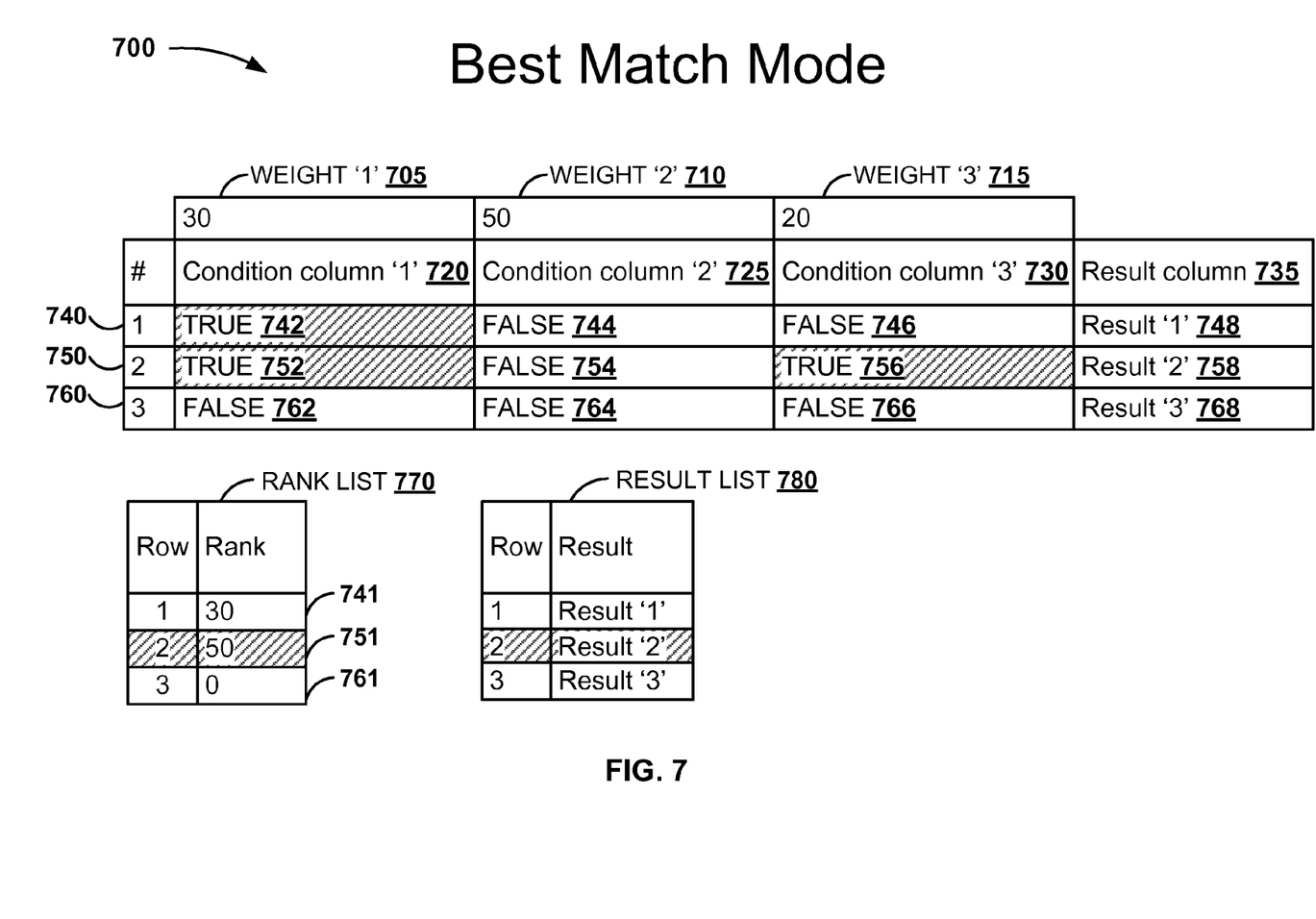
FIG. 7 illustrates evaluated decision rules of a decision table for an input combination of condition values, where the table is configured to operate in a best match mode, according to one embodiment.

FIG. 7 illustrates evaluated decision rules 740-760 of decision table 700 for an input combination of condition values, according to one embodiment. Conditions 742, 752, and 762 of the same condition type represented by condition column '1' 720 are associated with weight '1' 705, which equals 30 percent. Conditions 744, 754, and 764 of the same condition type represented by condition column '2' 725 are associated with weight '2' 710, which equals 50 percent. Conditions 746, 756, and 766 of the same condition type represented by condition column '3' 730 are associated with weight '3' 715, which equals 20 percent. The total sum of weights of the available conditions types in decision table 700 is 100 percent.

Rules 740-760 are processed in the best match mode of operation of table 700. In one embodiment, table 700 sequentially processes rules 740-750, starting with rule 740 in the first row. Condition 742 is fulfilled for the corresponding input condition value and result "true" is determined. Weight '1' 705 associated with the fulfilled condition 742 is added to rank 741 of rule 740. Conditions 744 and 746 are not satisfied, thus weight '2' 710 and weight '3' 715 associated with conditions 744 and 746 are not added to rank 741. Rank 741 of rule 740 equals weight '1' 705, e.g., 30 percent. Result '1' 748 of rule 740 is added to result list 780. Next processed is rule 750. Conditions 752 and 756 are fulfilled, and condition 754 is not fulfilled. Thus, rank 751 of rule 750 equals the sum of weight '1' 705 and weight '3' 715 associated with fulfilled conditions 752 and 756, e.g., rank 751 equals 50 percent. Next added to result list 780 is result '2' 758 of rule 750. Next processed is rule 760. No condition from conditions 762-766 of rule 760 is satisfied. Thus, rank 761 of rule 760 equals 0 percent. Weights of unfulfilled for the input conditions are not added to a rank of a rule. Next, result '3' 768 of rule 760 is added to result list 780. Based on rank list 770, rule 750 is determined as the rule with the highest rank. Thus, for the supplied input combination of condition values, decision table 700 returns as a result, result '2' 758 of rule 750. In one embodiment, result list 780 is reduced to include the result of the one or more best matching rules, e.g., result '2'.

In one embodiment, in case a condition is a default or blank, it may not be awarded the full weight which is assigned to the condition, but only partial weight, e.g. 50% of the weight. Because default conditions are assumed to be true, the relative significance of default conditions to the overall rank of a rule may be specified to be less than a regular condition from the same condition type. Thus, a differentiation is made between a condition satisfied for the input value and a blank condition. A condition satisfied for the input value could be seen as a better match than a default condition, which is satisfied for any input value. For example, in case condition 752 is a default generic one, then only half of the full weight '1' 705 may be added to rank 751, e.g., 15 percent instead of the full weight of 30 percent. In such case, rank 751 of rule 750 would be 35 percent.

Processing in the best match mode, does not require that a matching combination of conditions is found for the table to return a result. For example, no rule from rules 740-760 of table 700 has all conditions satisfied for the input combination of condition values. Nevertheless, table 700 outputs a result associated with the rule with the highest rank. In one embodiment, a decision table configured to operate in a single or multiple match mode may be further configured to operate in the best match mode.

Figure 8:
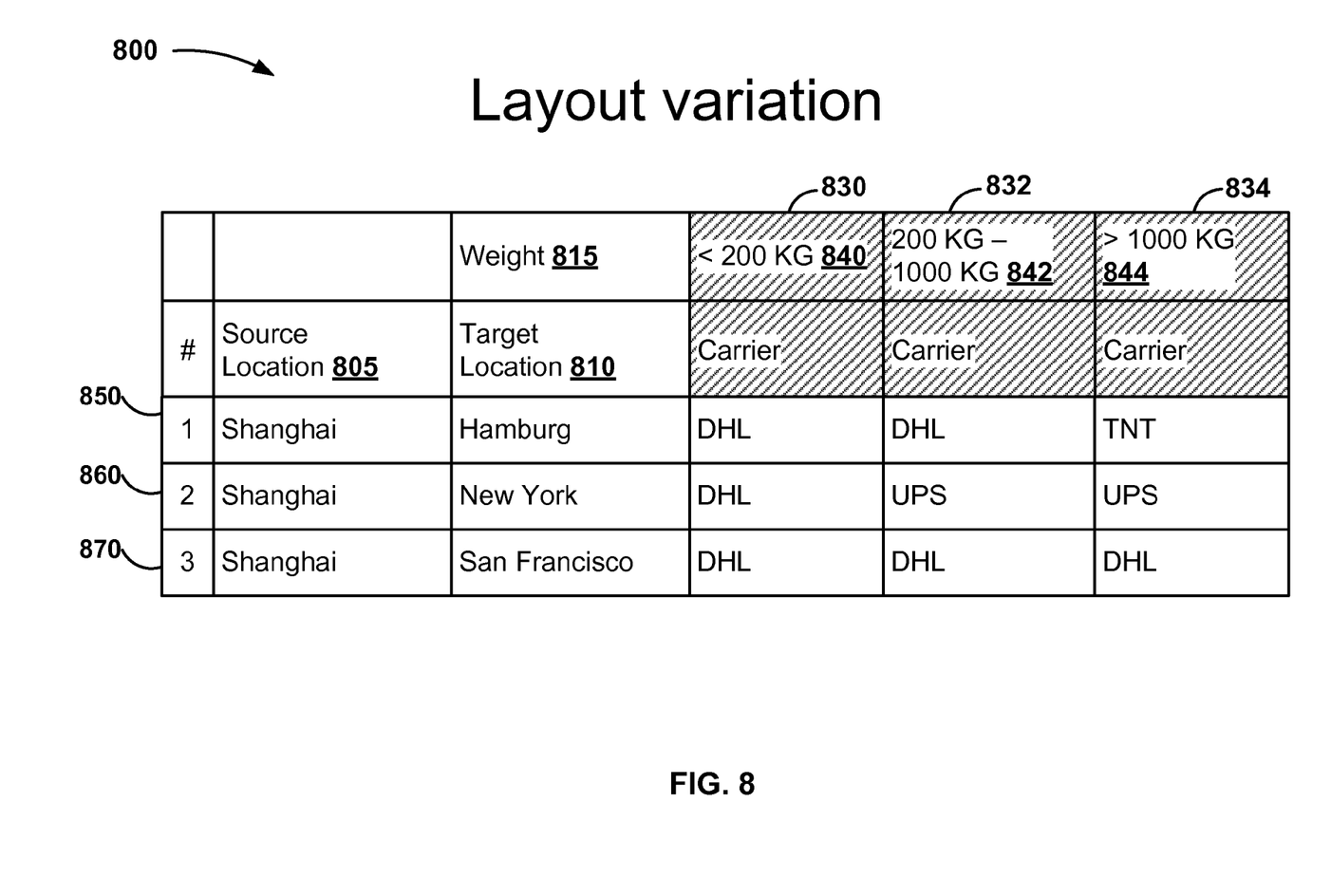
FIG. 8 illustrates an exemplary layout of a decision table.

FIG. 8 illustrates an exemplary layout of decision table 800. Decision tables may have various structures or layouts. It is possible to add conditions into headers of result columns. For example, conditions 840-844 related to condition type "Weight" 815 are included in result columns 830-834 of type "Carrier". It is possible to add conditions from more than one condition type into result columns Other conditions may still be presented under the conditions columns of a decision table. For example, the conditions of type "Source Location" and "Target Location" are under condition columns of decision table 800. Adding conditions into headers of result columns represents a rearrangement of the structure of a decision table. Logically, evaluation of decision rules is not changed by a rearrangement of a decision table. The number of results to be defined for each rule grows in proportion to number of condition classes included in the result columns. For example, for each rule from rules 850-870, instead of defining a single result cell, three result cells are defined for each condition from condition 840-844.

Figure 9:
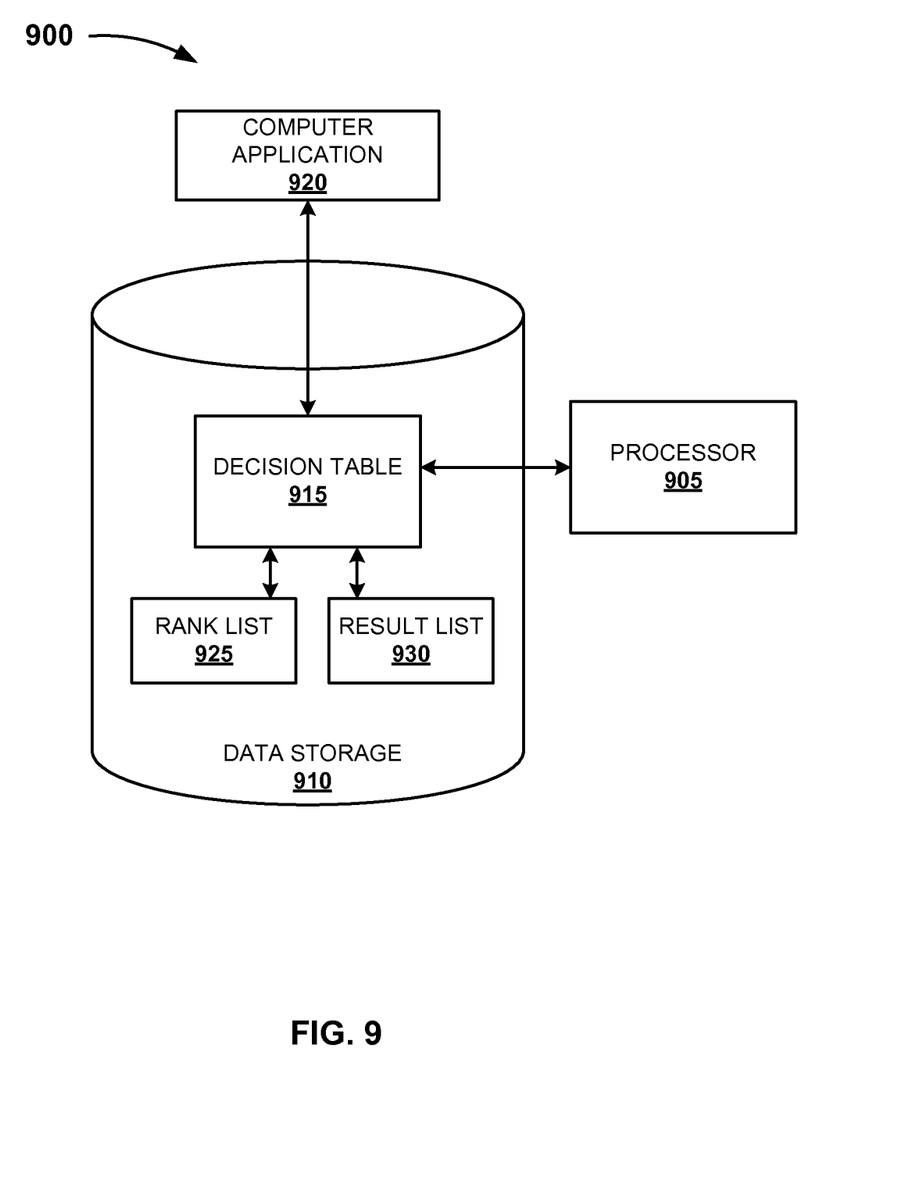
FIG. 9 is an exemplary system to identify a best match in a decision table, according to one embodiment.

FIG. 9 is an exemplary system 900 to identify a best match in a decision table, according to one embodiment. System 900 includes computer application 920 coupled to decision table 915. Computer application 920 may supply an input combination of condition values to decision table 915. Decision table 915 is configured to operate in a best match mode. Decision table 915 is stored in data storage 910. Data storage 910 further includes rank list 925 and result list 930 associated with decision table 915. Result list 930 includes results of the decision rules of decision table 915.

The input combination of condition values is received at decision table 915. In response to the received input, processing of decision table 915 is triggered. Decision table 915 coupled to processor 905 evaluates decision rules of decision table 915 against the input combination of condition values. Based on the evaluation of the rules, ranks of the rules are stored in rank list 925. Based on the ranks included in rank list 925, a best matching rule is identified. The rule with the highest rank may be determined as the best matching rule. Result list 930 is reduced to include the result of the identified best matching rule. Decision table 915 returns the result of the best matching rule to computer application 920.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 10:
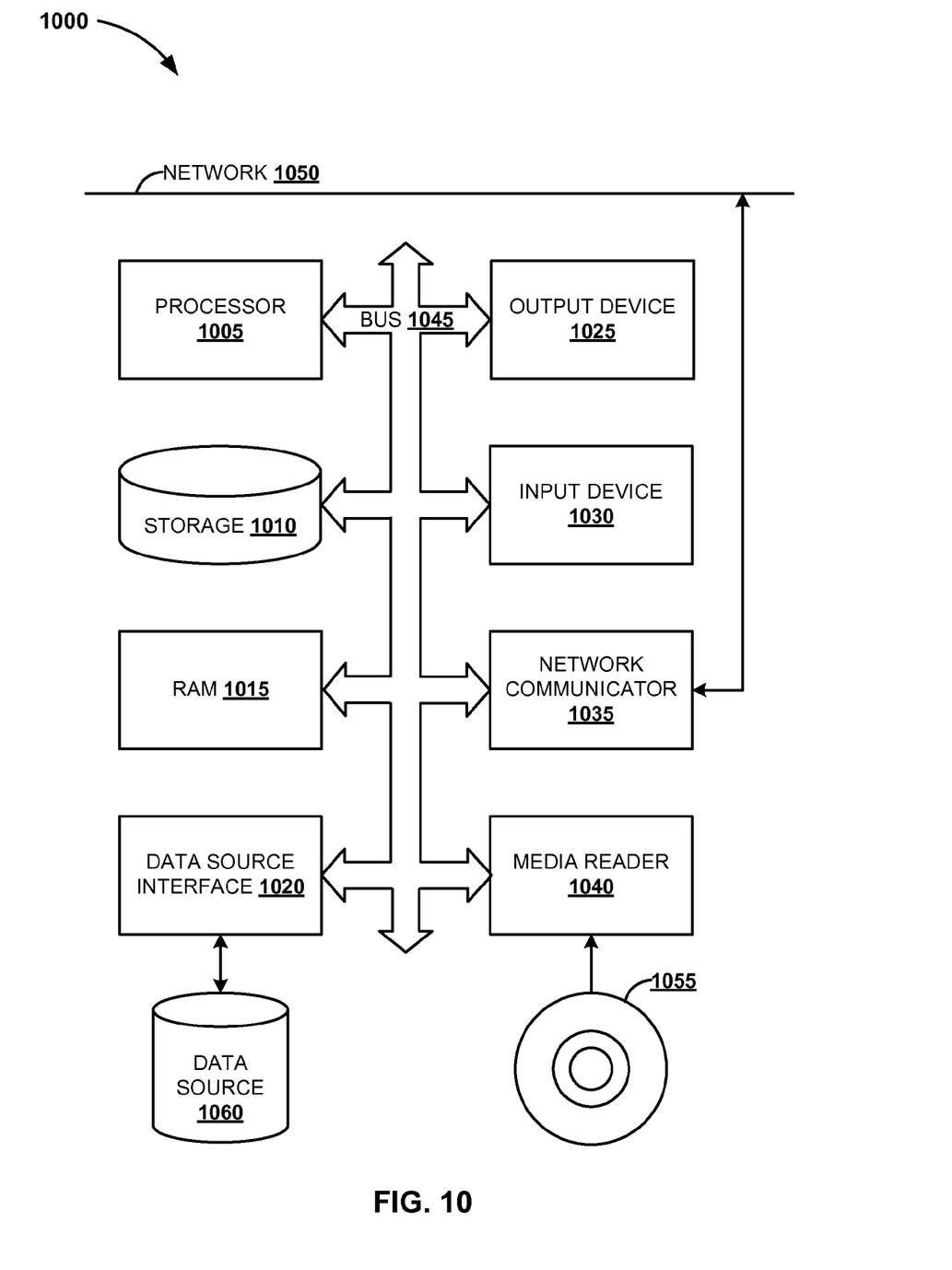
FIG. 10 illustrates an exemplary computer system, according to one embodiment.

FIG. 10 is a block diagram of an exemplary computer system 1000. The computer system 1000 includes a processor 1005 that executes software instructions or code stored on a computer readable storage medium 1055 to perform the above-illustrated methods. The processor 1005 can include a plurality of cores. The computer system 1000 includes a media reader 1040 to read the instructions from the computer readable storage medium 1055 and store the instructions in storage 1010 or in random access memory (RAM) 1015. The storage 1010 provides a large space for keeping static data where at least some instructions could be stored for later execution. According to some embodiments, such as some in-memory computing system embodiments, the RAM 1015 can have sufficient storage capacity to store much of the data required for processing in the RAM 1015 instead of in the storage 1010. In some embodiments, all of the data required for processing may be stored in the RAM 1015. The stored instructions may be further compiled to generate other representations of the instructions and dynamically stored in the RAM 1015. The processor 1005 reads instructions from the RAM 1015 and performs actions as instructed. According to one embodiment, the computer system 1000 further includes an output device 1025 (e.g., a display) to provide at least some of the results of the execution as output including, but not limited to, visual information to users and an input device 1030 to provide a user or another device with means for entering data and/or otherwise interact with the computer system 1000. Each of these output devices 1025 and input devices 1030 could be joined by one or more additional peripherals to further expand the capabilities of the computer system 1000. A network communicator 1035 may be provided to connect the computer system 1000 to a network 1050 and in turn to other devices connected to the network 1050 including other clients, servers, data stores, and interfaces, for instance. The modules of the computer system 1000 are interconnected via a bus 1045. Computer system 1000 includes a data source interface 1020 to access data source 1060. The data source 1060 can be accessed via one or more abstraction layers implemented in hardware or software. For example, the data source 1060 may be accessed by network 1050. In some embodiments the data source 1060 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the invention are described herein for illustrative purposes, various equivalent modifications are possible within the scope of the invention, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer implemented method to identify a best match in a decision table, the method comprising:
the computer, receiving an input combination of at least one condition value to be evaluated against at least one rule of the decision table, wherein the at least one rule includes at least one condition associated with a result;
the computer, evaluating the at least one rule against the input combination to determine conditions fulfilled for the at least one condition value by:
evaluating each condition of each rule from the at least one rule, wherein each condition is associated with a weight, and
for each fulfilled condition, adding a weight associated with the fulfilled condition to determine a rank of a corresponding rule;
determining a rule from the at least one rule with the highest rank; and
outputting a result associated with the rule with the highest rank.

2. The method of claim 1, wherein determining the rule from the at least one rule that best matches the input combination further comprises:
for each rule from the at least one rule, counting conditions that are fulfilled for the at least one condition value to determine a rank of a corresponding rule; and
determining the rule from the at least one rule with most fulfilled conditions.

3. The method of claim 1, wherein adding a weight associated with the fulfilled condition to determine the rank of the corresponding rule further comprises:
adding a percentage of the weight associated with the fulfilled condition to determine the rank when the fulfilled condition is default.

4. The method of claim 1 further comprising:
determining a first rule from the at least one rule that best matches the input combination, wherein the at least one rule is ordered in a sequence in the decision table;
determining a second rule from the at least one rule that best matches the input combination, wherein the second rule follows the first rule in the sequence, and wherein a rank of the first rule equals a rank of the second rule; and
outputting a result of the first rule.

5. The method of claim 1 further comprising:
assigning at least one weight to the at least one condition of the at least one rule.

6. The method of claim 1 further comprising:
generating a rank list including at least one rank of the at least one rule, and
based on the at least one rank in the rank list, determining a rule with the highest rank.

7. A computer system to identify a best match in a decision table, the system including:
a memory to store computer executable instructions; and
a processor coupled to the memory to execute the instructions to:
at the decision table, receive an input combination of at least one condition value to be evaluated against at least one rule of the decision table, wherein the at least one one rule includes at least one condition associated with a result;
the decision table to:
evaluate the at least one rule against the input combination to determine conditions fulfilled for the at least one condition value by:
evaluating each condition of each rule from the at least one rule, wherein each condition is associated with a weight, and
for each fulfilled condition, adding a weight associated with the fulfilled condition to determine a rank of a corresponding rule;

determine a rule from the at least one rule that best matches the input combination; and output a result of the rule with the highest rank.

8. The computer system of claim 7, wherein determining the rule that best matches the input combination further comprises:

for each rule from the at least one rule, determine a number of conditions that are fulfilled for the at least one condition value; and determine the rule from the at least one rule with most fulfilled conditions.

9. The computer system of claim 7 further to:

determine a first rule from the at least one rule that best matches the input combination, wherein the at least one rule is ordered in a sequence in the decision table;

determine a second rule from the at least one rule that best matches the input combination, wherein the second rule follows the first rule in the sequence, and wherein a rank of the first rule equals a rank of the second rule; and output a result of the first rule.

10. The computer system of claim 7, wherein the at least one condition of the at least one rule is assigned at least one weight.

11. The computer system of claim 7, further comprising a rank list including at least one rank of the at least one rule.

12. A non-transitory computer readable medium storing instructions thereon, which when executed by a processor cause a computer system to:

receive an input combination of at least one condition value to be evaluated against at least one rule of the decision table, wherein the at least one rule includes at least one condition associated with a result;

evaluate the at least one rule against the input combination to determine conditions fulfilled for the at least one condition value by:

evaluating each condition of each rule from the at least one rule, wherein each condition is associated with a weight, and for each fulfilled condition, adding a weight associated with the fulfilled condition to determine a rank of a corresponding rule;

determine a rule from the at least one rule that best matches the input combination; and output a result of the rule that best matches the input combination.

13. The computer readable medium of claim 12, wherein determining the rule that best matches the input combination further comprises:

for each rule from the at least one rule, counting conditions that are fulfilled for the at least one condition value; and determining the rule from the at least one rule with most fulfilled conditions.

14. The computer readable medium of claim 12, wherein adding a weight associated with the fulfilled condition to determine the rank of the corresponding rule further comprises:

adding a percentage of the weight associated with the fulfilled condition to determine the rank when the fulfilled condition is default.

15. The computer readable medium of claim 12, wherein the instructions when executed by the processor cause the computer system further to:

determine a first rule from the at least one rule that best matches the input combination, wherein the at least one rule is ordered in a sequence in the decision table;

determine a second rule from the at least one rule that best matches the input combination, wherein the second rule follows the first rule in the sequence, and wherein a rank of the first rule equals a rank of the second rule; and output a result of the first rule that best matches the input combination.

16. The computer readable medium of claim 12, wherein the instructions when executed by the processor cause the computer system further to:

assign at least one weight to the at least one condition of the at least one rule.

17. The computer readable medium of claim 12, wherein the instructions when executed by the processor cause the computer system further to:

generate a rank list including at least one rank of the at least one rule, and based on the at least one rank in the rank list, determining a rule with the highest rank.

18. A computer implemented method to identify a best match in a decision table, the method comprising:

the computer, receiving an input combination of at least one condition value to be evaluated against a plurality of rules of the decision table, wherein the plurality of rules include at least one condition associated with a result;

the computer evaluating the plurality of rules against the input combination to determine conditions fulfilled for the at least one condition value;

based on determined fulfilled conditions of the plurality of rules, determining ranks of the plurality of rules;

based on the ranks of the plurality of rules, determining a rule from the plurality of rules that best matches the input combination; and outputting a result of the rule that best matches the input combination.

* * * * *